UNITED STATES PATENT OFFICE.

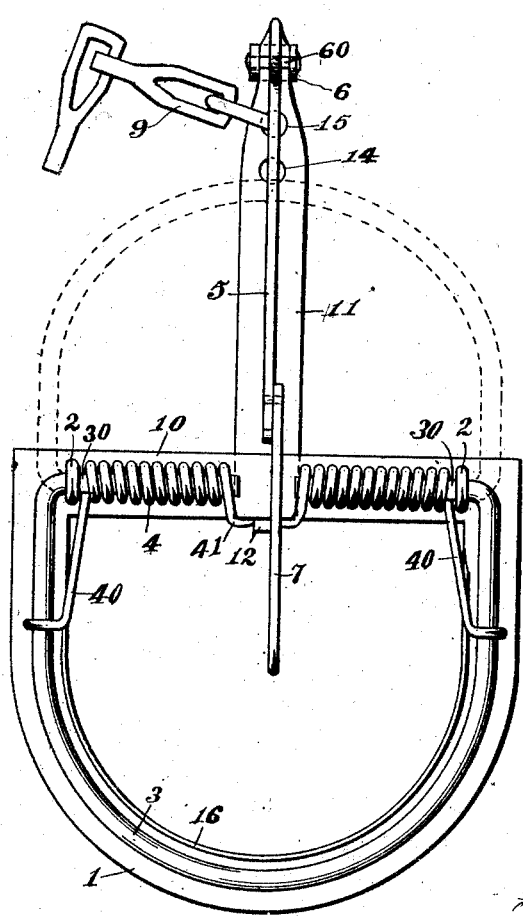
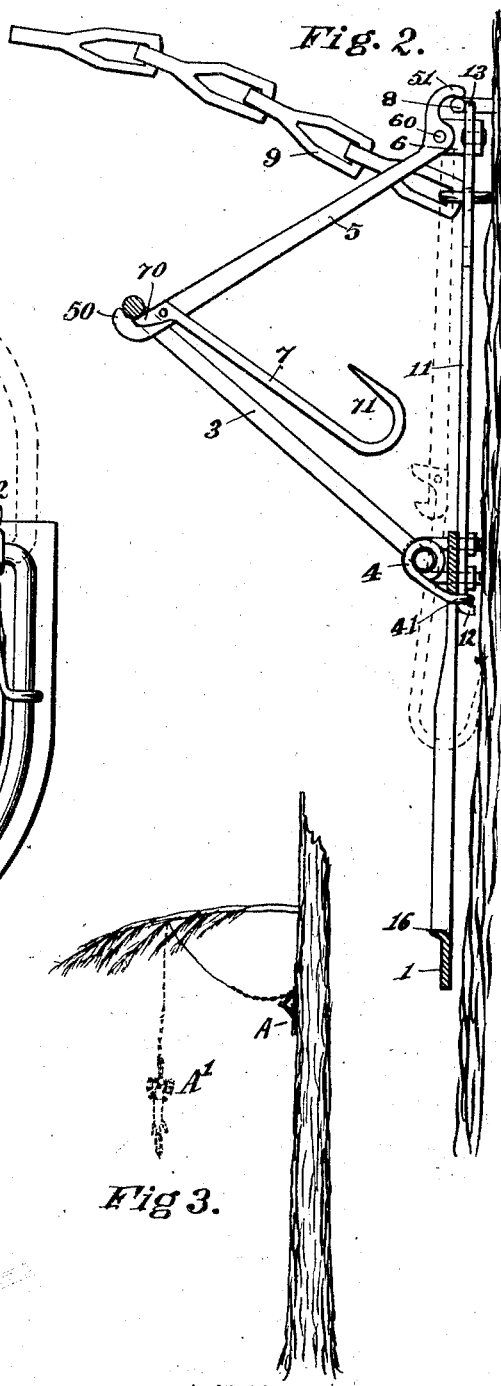

JOHN C. WOOD, OF MOUNT VERNON, WASHINGTON.

TRAP.

No. 928,352.

Specification of Letters Patent.

Patented July 20, 1909.

Application filed June 20, 1908. Serial No. 439,610.

*To all whom it may concern:*

Be it known that I, JOHN C. WOOD, a citizen of the United States, residing at Mount Vernon, Skagit county, Washington, have invented certain new and useful Improvements in Traps, of which the following is a specification.

My invention relates to an improvement in traps, and comprises the novel parts and combinations of parts hereinafter described and particularly pointed out in the claims.

The object of my invention, besides being to generally improve their construction and adaptability, is particularly to provide a trap which shall be especially adapted to use as a tree trap, that is, for setting upon trees to catch tree climbing animals.

In the accompanying drawings I have shown my invention embodied in the form which is now preferred by me.

Figure 1 is a front or face view of my trap. Fig. 2 is a longitudinal section showing the trap in edge view. Fig. 3 shows the manner of using the trap when catching the tree climbing animals.

My trap belongs to that class which has a base or frame, a pivoted, loop-like jaw or arm and a spring acting upon said jaw or arm to close it down upon the frame or base. These features are broadly old, but in the form shown and in the manner of their application they are believed to be new.

My invention also embodies certain features which are believed to be broadly new.

The base or frame of my trap consists of a plate or bar composed of two principal parts, a curved portion 1, and a straight bar 10, connecting the ends of the latter, the whole being essentially of a D-shape. This D-shape having the large central opening is that which is preferred by me, although this is not material in considering certain features of my invention.

As a convenient means for supporting the catch and tripper mechanism, I provide a rearwardly extending arm 11, herein shown as secured centrally of the straight bar 10 constituting the stem of the D.

The movable jaw comprises the bar 3, curved to conform to the curvature of the bar 1, its ends 30 being bent inwardly to lie along the straight part 10 of the base. These ends pass through pivot staples 2 secured to the frame, or are otherwise pivoted to the base or frame.

The spring 4 employed by me to act upon the jaw or arm 3, is preferably a coiled helical spring and surrounds the straight pivot portions 30 of this jaw. The spring ends 40 are bent to engage the jaw 3 to hold it down, and the central portion is formed into a loop 41 which engages a finger 12 supported from or forming a part of the base or frame. As shown this finger is the projecting end of the rearwardly extending arm 11 which carries the catch and tripper mechanism. Any suitable construction which accomplishes the desired result may be substituted therefor.

The catch 5 which holds the jaw 3 in raised position is hinged or pivoted to the arm 11 and has a shoulder or hook 50 which engages the jaw, as shown in full lines in Fig. 2. I have shown this catch as pivoted upon a pivot 60 carried by a clip 6 secured to the outer portion of the arm 11.

Pivoted upon the catch 5 is the trigger 7 which has a short arm 70 so placed as to force disengagement of the catch when the trigger is pulled down or forward. This trigger is provided with means for securing the bait thereto, as the hook 71.

When the trap is designed for use as a tree trap, that is for catching tree climbing animals, I prefer that the catch, trigger and jaw be so proportioned that the bait, when the trap is set, shall lie back of or above the jaw pivot, the same being the condition shown in Fig. 2. When so used the trap is hung in vertical position against the side of a tree trunk at such a height that it can not be reached without climbing up the tree. In this position of the trap and its parts any animal climbing the tree to secure the bait would naturally get into a favorable position to be caught before they could reach the bait.

I have provided two separate means for supporting the trap, either of which may be employed as desired. The simplest consists of a hole 14 in the arm 11, whereby it may be hung upon a nail or like device. The other consists of a hook like extension 51 of the catch 5, which is adapted for engagement with a staple or bent nail 8, or with a loop of string or other suitable support. If desired or necessary the upper end of the arm 11 may be made to approach this hook 51 when the catch is in set position so as to make therewith a closed eye for the reception of the staple 8, or its equivalent support.

In using the hook 51 as the suspending means it is obvious that when the trap is sprung the catch will fly down and the hook will be released from its support, thus permitting the trap to fall. The same result would, as a rule, occur were the trap suspended from a smooth headed nail by the hole 14. The disturbance caused by the springing of the trap as well as the struggles of the trapped animal would generally dislodge the trap from its nail.

In trapping certain of the smaller fur bearing animals, of which the marten may be taken as typical, it is customary to put the trap against the side of a tree above the snow line sufficient to prevent non-climbing animals from reaching it or any game caught therein. However such climbing animals as the cougar, or panther, the lynx, wild cats etc., may come along and eat up the trapped game. The skin of such an animal may be worth $30 or more, which represents a considerable loss. This is apt to occur a great many times during a season, which makes the total loss very considerable.

One of my principal objects has been to produce a trap which will be automatically removed from the reach of predatory game as soon as it has been tripped, so that the game caught therein may be preserved until the trapper reaches the trap. To do this I make the trap disengageable from its normal support as soon as sprung, as has been described, and provide means for swinging it from a limb of the tree at a distance from the trunk. The means for disengaging the trap from the trunk has been described. In connection with this I have a chain, as 9, secured to the trap and lengthened with a rope or any other convenient and suitable means, as much as necessary to enable it to be secured to a limb at some distance from the trunk. When the trap is freed from its normal support on the tree trunk it will swing away from the trunk far enough to prevent another animal from getting at it or the game caught therein. In this way hundreds of dollars may be saved to a single trapper in a single season.

I have shown the bar 1 forming the base of the trap as having a slightly raised flange 16 about its inner margin. This makes the secure holding of the trapped animal more certain and I prefer that the trap be so made, although this is not an essential feature of my invention.

In Fig. 3 I have shown two traps, one in place upon a tree trunk and the other in the swinging position which it would assume as soon as sprung. The feature of transferring the trap from an accessible support to an inaccessible support as soon as sprung I believe to be broadly new and wish to so claim it.

Having thus described my invention, what I claim and desire to secure by Letters Patent is:

1. A trap provided with two distinct supporting means, and means whereby the support is shifted from one of said supporting means to the other when the trap is sprung.

2. A trap having a chain or like suspension means, means separate from said chain for supporting the trap in an elevated position, and means for releasing the trap from the latter supporting means when it is sprung.

3. A trap provided with a chain or like member whereby it may be secured to a tree limb at a distance from the tree trunk while permitting the trap to be supported against the trunk, means for supporting the trap against the tree trunk, and means controlled by the catch adapted to release the trap from said latter supporting means when the trap is sprung.

4. A trap provided with means for supporting it against a vertical surface, as a tree trunk, said means being adapted to free the trap from said support when sprung, and means for supporting the trap at a distance from said vertical supporting surface after it is sprung.

In testimony whereof I have hereunto affixed my signature at Mount Vernon, Skagit county, Washington, this 12th day of June, 1908.

JOHN C. WOOD.

Witnesses:
HENRY A. McLEAN,
FRED G. PICKERING.